US005227120A

United States Patent [19]

Leland

[11] Patent Number: 5,227,120

[45] Date of Patent: Jul. 13, 1993

[54] METHOD FOR PROTECTING AUSTENITIC STAINLESS STEELS FROM SOLVENT ATTACK BY MOLTEN MAGNESIUM BY FORMING CRUCIBLE AND CRUCIBLE

[75] Inventor: John D. Leland, Corvallis, Oreg.

[73] Assignee: Teledyne Industries, Inc., Albany, Oreg.

[21] Appl. No.: 757,279

[22] Filed: Sep. 10, 1991

[51] Int. Cl.[5] .......... C22B 9/02; B23K 9/00

[52] U.S. Cl. .......... 266/275; 266/282; 219/137 R

[58] Field of Search .......... 266/282, 242, 275; 219/137 R

[56] References Cited

U.S. PATENT DOCUMENTS

| | | | |
|---|---|---|---|
| 2,262,220 | 11/1941 | Bennett et al. | 266/282 |
| 3,185,814 | 5/1965 | Rossner et al. . | |
| 3,428,774 | 2/1969 | Faust et al. . | |
| 3,626,138 | 12/1971 | Hurley . | |
| 3,692,971 | 9/1972 | Kniepkamp . | |
| 4,224,360 | 9/1980 | Ohnishi et al. . | |
| 4,353,535 | 10/1982 | Humberstone | 75/594 |
| 4,363,952 | 12/1982 | Onishi et al. . | |
| 4,609,577 | 9/1986 | Long . | |
| 4,624,402 | 11/1986 | Pitcairn et al. . | |
| 4,624,406 | 11/1986 | Yasuda et al. . | |
| 4,916,032 | 4/1990 | Humberstone | 428/683 |

FOREIGN PATENT DOCUMENTS

| | | | |
|---|---|---|---|
| 595404 | 12/1947 | United Kingdom | 75/600 |

*Primary Examiner*—Melvyn J. Andrews

*Attorney, Agent, or Firm*—Shoemaker and Mattare Ltd.

[57] ABSTRACT

A crucible for containing molten mixtures of magnesium and magnesium chloride comprises an outer relatively thick base layer of austenitic stainless steel covered inside with a relatively thin layer of mild carbon steel. The stainless layer provides strength and good creep resistance at 850° C., and the mild steel layer protects the stainless layer from chemical attack by liquid magnesium. The carbon steel lining is applied by weld overlaying.

4 Claims, 1 Drawing Sheet

METHOD FOR PROTECTING AUSTENITIC STAINLESS STEELS FROM SOLVENT ATTACK BY MOLTEN MAGNESIUM BY FORMING CRUCIBLE AND CRUCIBLE

BACKGROUND OF THE INVENTION

This invention relates generally to metallurgical apparatus, and particularly to a crucible for containing mixtures of magnesium and magnesium chloride. The invention also relates to a method for manufacturing such a crucible, to protect it from attack by molten magnesium.

It is common to provide crucibles or chemical reactors with stainless steel linings or layers, to prevent corrosion of the major component of the crucible, which is often carbon steel.

In the production of zirconium and titanium by the Kroll process, a normal byproduct is a mixture of magnesium (Mg) and magnesium chloride ($MgCl_2$). To improve process economics, it is desirable to separate these two substances so that the magnesium may be recycled in the process. One method of separating magnesium from magnesium chloride is to melt the mixture under an inert atmosphere. The densities of the liquids are different, and when the mixture is fully molten, magnesium floats to the top. The melting temperature of magnesium is about 650° C., while that of magnesium chloride is about 715° C. Thus, the presence of magnesium chloride generated by the Kroll process increases the required crucible temperature. Furthermore, in order to establish reasonably rapid heat transfer to the melt, it is necessary to heat the crucible containing the mixture to about 850° C. Such temperatures not only aggravate any solvent attack by molten magnesium on the crucible (that is, the tendency for the magnesium to dissolve the crucible), but also render unsuitable, from a strength or creep resistance standpoint, certain materials that do not react with molten magnesium, such as carbon steel.

Creep is the slow, plastic deformation that occurs in a metal subject to high temperature and stress over a long period of time. It may be measured in various ways, for example, by percent elongation per unit time at a given applied stress. A bar made of 316 stainless steel subjected to a tensile stress of 3000 psi at a temperature of 1500° F. will grow by about 0.1% in length every 1000 hours; a low carbon 1005 steel under the same conditions will grow much faster.

It is possible to use a crucible constructed entirely from carbon steel, for example SA-516 grade 70, about two inches thick, but under the temperatures indicated, such a crucible distorts and is rendered useless by creep effects in short order. In addition, the exterior surface of the crucible oxidizes severely, and spalls off in large flakes. The spalling reduces the thickness of the crucible in time, and also provides an opportunity for short circuiting the electric furnace in which the crucible is placed. Thus, the temperatures mentioned are too high for mild carbon steels.

U.S. Pat. No. 4,353,535 describes a crucible fabricated from type 444 stainless steel, which is a ferritic stainless steel. This is an improvement over carbon steel crucibles, particularly where only molten magnesium is to be contained. Ferritic stainless steels resist surface oxidation, and possess higher temperature strength and creep resistance than do mild steels, but ferritic stainless steels are still inadequate for the purpose mentioned above, and will suffer similar distortion and failure in time.

Another solution has been to use a crucible machined from graphite. However, some carbon from such crucibles may dissolve into the melt, to the detriment of the process. Furthermore, graphite is expensive, and comparatively fragile.

Austenitic stainless steels, which are characterized by their nickel content, do possess adequate strength and creep resistance at 850° C.; however, steels of this type are attacked by molten magnesium. Apparently, molten magnesium attacks the nickel component, leading to intergranular cracks and ultimate weakening. Therefore, austenitic stainless steel can be used as a crucible for containing 850° C. magnesium mixtures only if the interior of the crucible is coated with a non-reactive metal, such as carbon steel, lacking the nickel component.

It is known to join layers of mild steel and austenitic stainless steel by explosive cladding. However, explosive methods are very expensive, and, because there are few practitioners of this art, it is difficult to have crucibles produced without long production delays.

Lining a stainless steel crucible with carbon steel by more conventional methods, such as weld overlaying, is problematic, because theory predicts that it will not work. When heated, austenitic stainless steel expands at a rate about 30% greater than does mild steel; that is, the coefficients of thermal expansion are substantially different. The differential expansion is so great that, at 850° C., tensile failure (fracturing) of the carbon steel is predicted. Indeed, experts in this field are reluctant to take on the task of overlaying a stainless steel crucible with mild steel.

It should be noted that metals generally fail in tension, not compression. Therefore, prior workers who overlaid carbon steel substrates with relatively thin layers of stainless steel did not encounter cracking problems, since as the laminates were heated, the stainless coating layer was placed in compression when heated (the much thicker substrate receiving being placed in relatively little tension).

We have discovered that, even though fracturing does occur in a mild steel liner deposited on an austentic stainless steel substrate, the fractures do not extend the full depth of the liner. Thus, we have discovered that weld overlaying can be used to protect an austenitic stainless steel liner from molten magnesium at 850° C.

SUMMARY OF THE INVENTION

An object of this invention is to provide a method of fabricating a crucible which may be used to contain mixtures of magnesium and magnesium chloride in the molten state, at temperatures of up to about 850° C. Another object of the invention is to provide a more expedient way of fabricating crucibles used to contain mixtures of magnesium and magnesium chloride.

The present invention solves the problem of containing a molten mixture of magnesium and magnesium chloride in a crucible fabricated from an austenitic stainless steel by providing a layer of mild steel on the interior of the crucible. The mild steel is applied to the stainless steel by the process of weld overlaying. The mild steel is resistant to the molten magnesium, but not to the high temperature. The austenitic stainless steel is resistant to the high temperature, and supports the mild steel layer, which in turn protects the stainless steel from the molten magnesium.

Of course, weld overlaying is not a new process. It has been practiced before with various materials, and has been used to deposit stainless steel layers on mild steel substrates. Methods of producing weld overlays, by either electroslag welding or submerged arc welding, are well known. Representative publications that describe how to perform the such processes include *Modern Welding Technology*, by Howard B. Cary, published by Prentice-Hall, Inc., Englewood Cliffs, N.J. (copyright 1979), pages 663–674; *Welding Handbook*, Six Edition, published in 1970 by the American Welding Society, New York (Section 3A, chapter 44); and *Metals Handbook*, Ninth Edition, published in 1983 by the American Society for Metals, Metals Park, Ohio, volume 6, pages 804–819.

Although applying a layer of stainless steel to a carbon steel substrate by these methods is satisfactory, the use of weld overlaying to deposit mild steel on a thick austenitic stainless steel substrate is problematic, however, because of the great difference (about 30%) in thermal expansion coefficients between the two materials.

A crucible according to this invention comprises an outer base layer of austenitic stainless steel covered inside with a layer of mild carbon steel, the stainless layer thereby providing high strength and good creep resistance at 850° C., and the mild steel layer protecting the stainless layer from chemical attack by liquid magnesium. We have found, however, that mild steel can be deposited on the interior surface of a crucible fabricated from austenitic stainless steel by weld overlaying, and that an effective coating can thus be obtained, even though stresses greater than the ultimate strength of the mild steel layer occur within it.

The invention is based on the discovery that, despite the fact that the stresses generated in the overlaid mild steel are sufficient to cause cracking, such cracks do not extend through the full thickness of the overlaid layer, and thus the stainless base remains protected from attack by liquid magnesium.

BRIEF DESCRIPTION OF THE DRAWING

The accompanying drawing is a sectional view of a crucible embodying the invention, taken along a plane containing the longitudinal axis of the crucible.

DESCRIPTION OF THE PREFERRED EMBODIMENT

Figure 1:
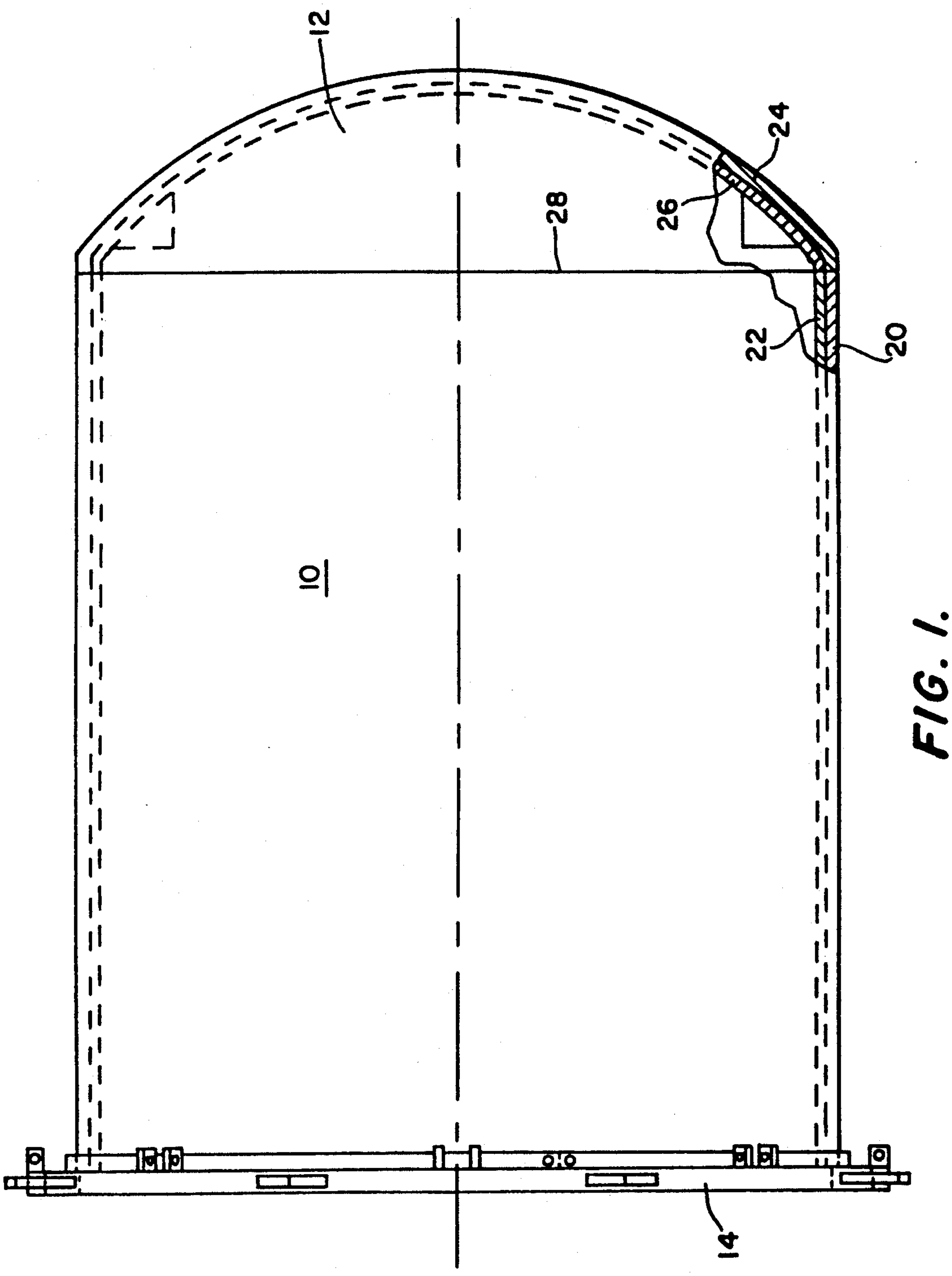

A crucible embodying the invention is shown in the drawing. The crucible comprises a cylindrical shell 10, closed at one end by a dome 12. These components are produced initially from plate stainless steel by conventional methods, formed to shape. A steel flange 14 is affixed around the open end of the crucible. A drain pipe may be provided in the domed end for draining the contents of the crucible.

The shell 10 comprises an outermost substrate 20 of austenitic stainless steel covered with an inner cladding layer 22 of mild carbon steel. Similarly, the domed end has an outer substrate 24 clad inside with a layer 26 of mild steel. The preferred substrate material is type 316 L stainless steel; any other 300- series austenitic stainless steel could be used. The dome is affixed to the shell by welding along an interface 28, this welding itself being covered with mild steel to prevent corrosion.

The mild steel layer is applied to the stainless steel substrate by known methods. The preferred method is a submerged arc weld overlaying process, the thickness of the overlaid mild steel layer being at least one-quarter inch. The preferred coating metal is AISI 1005, two inches wide and 0.030 inch thick. Alternatively, the newer electro-slag method could be used to deposit the mild steel.

The following U.S. Patents are directed generally to weld overlaying methods, materials and apparatus: U.S. Pat. Nos. 4,624,406, 4,363,952, 3,626,138, 4,624,402, 4,224,360, 3,428,774, 4,609,577, 3,692,971, 3,185,814. Their disclosures, which are incorporated herein by reference, are representative of disclosures enabling one to produce weld overlays.

It is critical that a low-carbon steel be used in practicing this invention, not so much for reasons of chemical non-reactivity, but for its low strength. We thus deliberately select a weak liner material, one that will fail in tension by cracking substantially in the radial direction, as it cools and shrinks. A stronger overlay material would tear away or disbond (delaminate) from the substrate material, by failing in the shear mode in the circumferential direction. A 1005 steel is preferred for the above reasons; however, other carbon steels having carbon contents of up to about one-tenth of a percent could be used. Such steels are encompassed by the term "mild" in the following claims.

It is contemplated that the stainless substrate material will be much thicker than the liner material; hence the terms "relatively thin" and "relatively thick" in the claims.

The method described above may be used to produce not only crucibles, but also other implements which must withstand contact with molten magnesium, such as agitators, thermowells, grates, floats, valves, or other items. Also, the invention is not limited to use with the Kroll process, but in fact is useful wherever devices which must contact molten magnesium. Inasmuch as the invention is subject to modifications and variations, it is intended that the foregoing description and the accompanying drawings shall be interpreted as illustrative of only one form of the invention, whose scope is to be measured by the following claims.

I claim:

1. An austenitic stainless steel crucible for use in containing molten magnesium and magnesium chloride, said crucible containing an interior cladding of mild steel for all surfaces in contact with the magnesium and magnesium chloride whereby cracks formed in the mild steel from the forming of the cladding and the differential thermal expansion of the cladding during repeated heating and cooling of the crucible, do not grow appreciably and therefore the cladding protects the stainless steel and particularly the nickel in the stainless steel from attack by the molten magnesium.

2. A method of preventing molten magnesium from attacking an austenitic stainless steel crucible comprising the steps of:

a) forming a crucible of suitable shape from austenitic stainless steel;

b) cladding the interior surfaces of the crucible to be in contact with molten magnesium with mild carbon steel attached by weld overlaying; whereby the barrier to crack propagation provided by the mild carbon steel cladding prevents the molten magnesium in the crucible from deleteriously attacking the nickel-containing stainless steel.

3. A method according to claim 2, wherein the weld overlaying is achieved by a submerged arc welding process.

4. A method according to claim 2, wherein the weld overlaying is achieved by a electro-slag welding process.

* * * * *